(12) United States Patent
Akino et al.

(10) Patent No.: US 6,390,804 B1
(45) Date of Patent: May 21, 2002

(54) GUIDING STRUCTURE FOR REGULATING TRAVELING DIRECTION OF SWING ARM

(75) Inventors: Ryuuji Akino; Yukihiro Kozuka, both of Fujisawa (JP)

(73) Assignee: Victor Company of Japan, Ltd., Kanagawa-ken (JP)

( * ) Notice: Subject to any disclaimer, the term of this patent is extended or adjusted under 35 U.S.C. 154(b) by 76 days.

(21) Appl. No.: 09/610,493

(22) Filed: Jul. 5, 2000

(30) Foreign Application Priority Data

Jul. 29, 1999 (JP) .......................................... 11-214864
Apr. 3, 2000 (JP) ...................................... 2000-100447

(51) Int. Cl.[7] .............................................. B29C 45/42
(52) U.S. Cl. ................... 425/556; 264/334; 425/DIG. 5
(58) Field of Search ........................... 425/556, DIG. 5; 264/334

(56) References Cited

U.S. PATENT DOCUMENTS 5,513,970 A * 5/1996 Kimura et al. ............... 425/556

* cited by examiner

*Primary Examiner*—Tim Heitbrink
(74) *Attorney, Agent, or Firm*—Connolly Bove Lodge & Hutz LLP

(57) ABSTRACT

A guiding structure for regulating a traveling direction of a swing arm has a swing arm, a rotating device having a rotary axis, and a conversion mechanism provided along the rotary axis of the rotating device for transmitting a rotary force caused by the rotating device to the swing arm and for regulating a traveling direction of the swing arm in accordance with a prescribed traveling path. The traveling direction of the swing arm is regulated by the conversion mechanism from a rotary direction to a thrust direction parallel to the rotary axis through an arcuate motion.

10 Claims, 8 Drawing Sheets

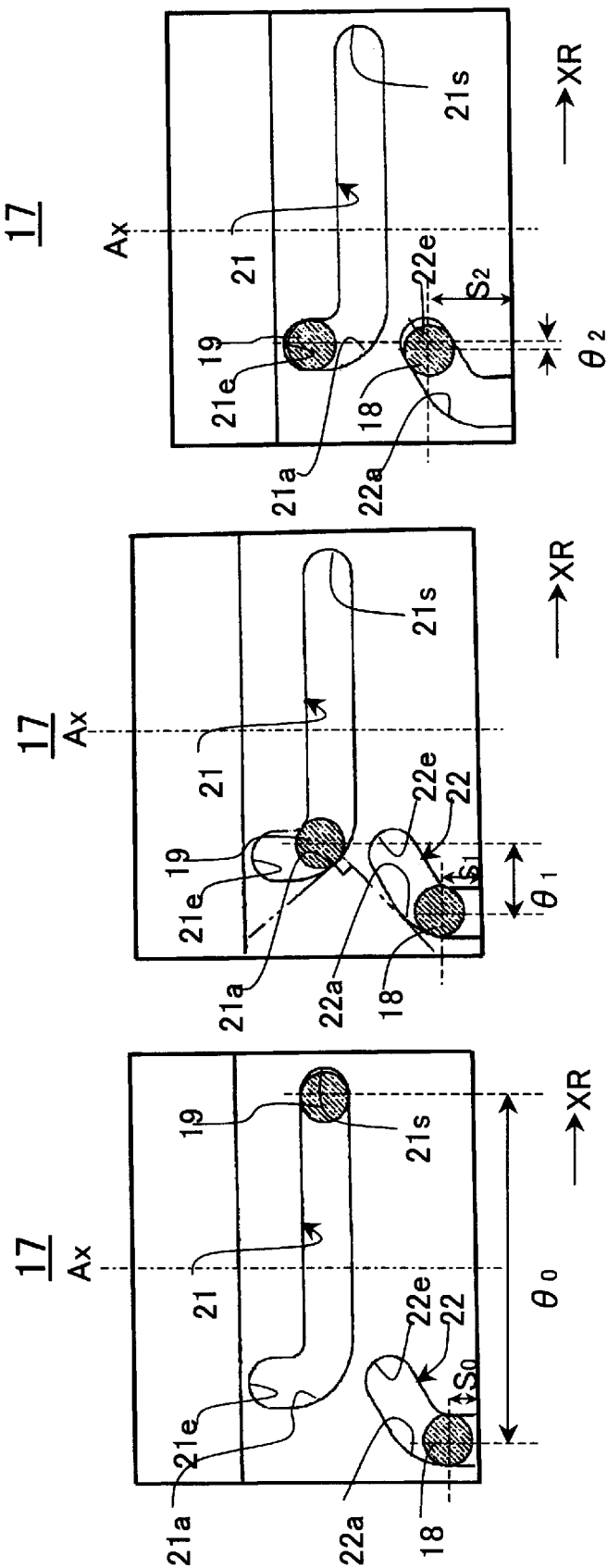

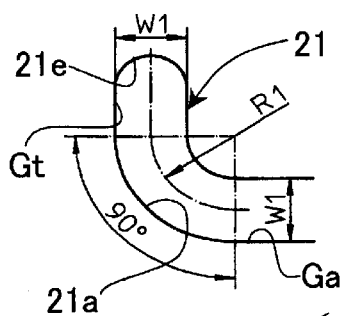
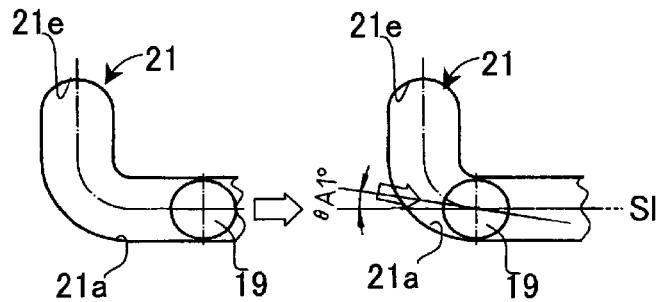
Fig. 7 (A)  Fig. 7 (B)  Fig. 7 (C)
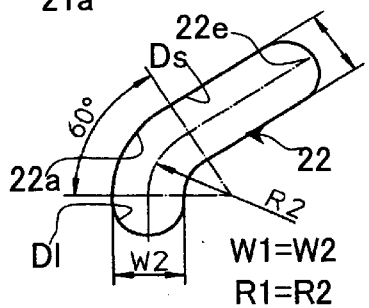
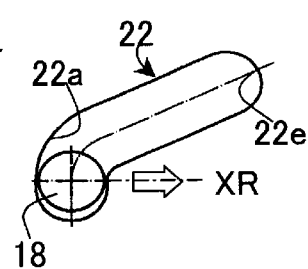
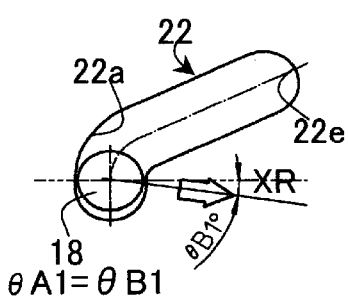
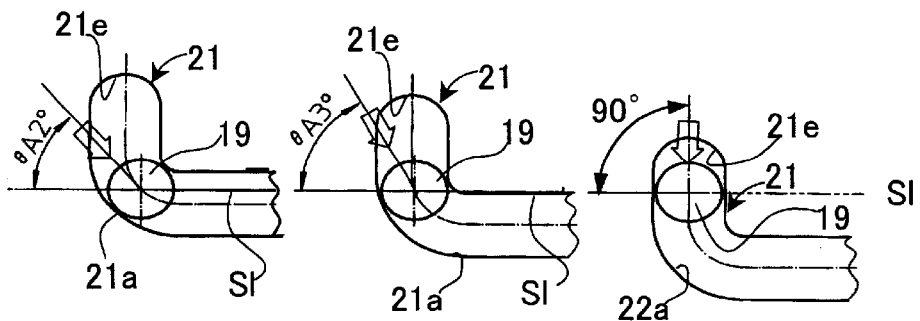
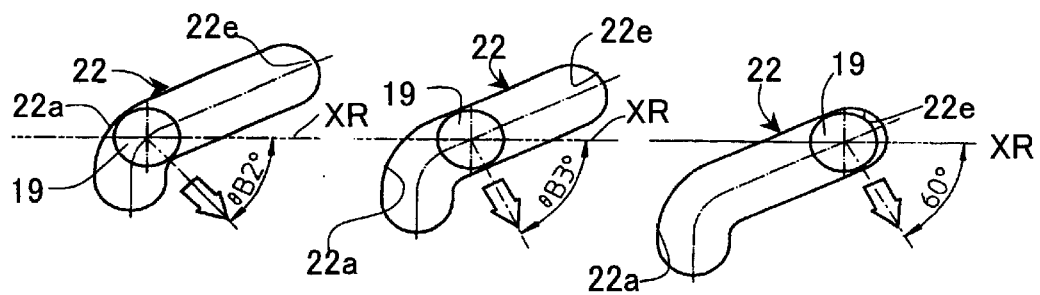
Fig. 7 (D)  Fig. 7 (E)  Fig. 7 (F)

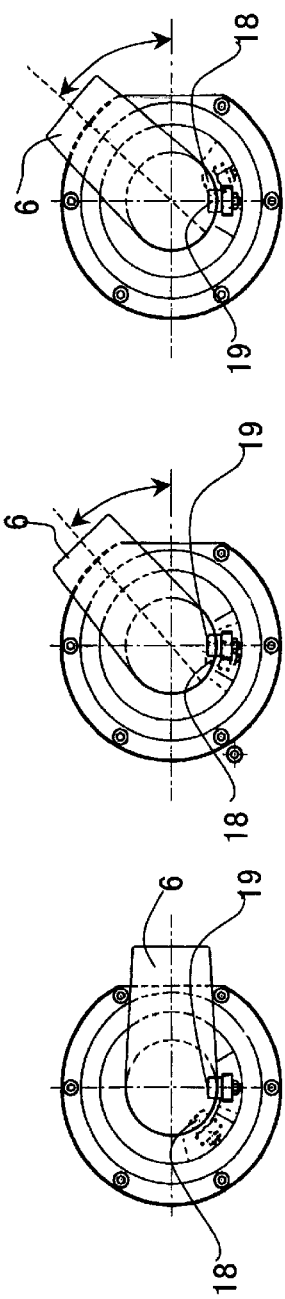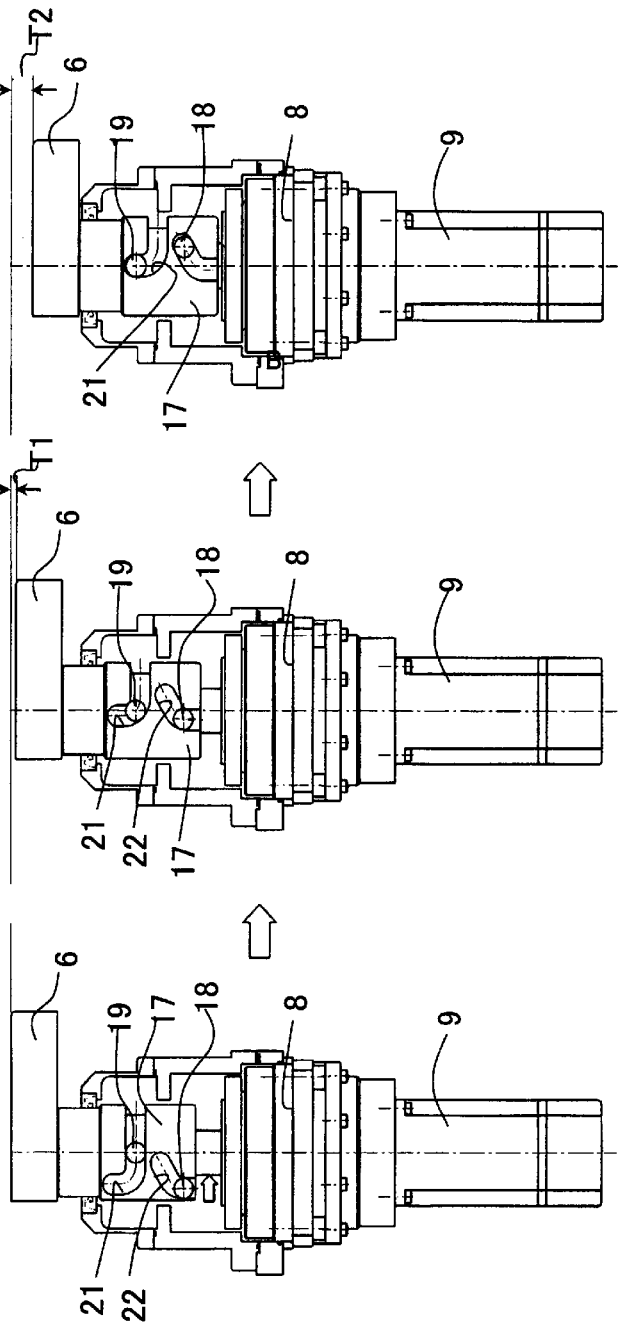
Fig. 8 (A1) Fig. 8 (B1) Fig. 8 (C1)
Fig. 8 (A2) Fig. 8 (B2) Fig. 8 (C2)

GUIDING STRUCTURE FOR REGULATING TRAVELING DIRECTION OF SWING ARM

BACKGROUND OF THE INVENTION

1. Field of the Invention

The present invention is related to a guiding structure for regulating a traveling direction of a swing arm in an arcuate motion, particularly, related to a guiding structure of a swing arm applicable to a taking out robot for swiftly and precisely taking a molded product out of a die used in an injection molding machine.

2. Description of the Related Arts

As well known, an injection-molding machine is provided with a molding die having both a fixed die and a movable die in the prior art. A molded product is produced by being interposed between the fixed and movable dies, and is taken out of the movable die at a high speed by a taking out machine such as a taking out robot when the movable die is separated from the fixed die. Specifically, this type of taking out robot has a swinging arm (referred to as a swing arm) with absorbing means at an end thereof for detachably holding the molded product. During the operation of injection molding the swing arm is retracted from the molding die. Upon taking out the molded product from the movable die, the swing arm rotatably travels to a predetermined position from a retracted position along a prescribed plane of rotation. Successively, the swing arm linearly travels in a thrust direction parallel to a rotary axis of the swing arm nearby the molded product to hold it with the absorbing means. As soon as the molded product is held with the absorbing means, the swing arm linearly returns in the thrust direction to the prescribed plane of rotation. Successively, the swing arm rotates to a taking out position where the molded product is detached from the absorbing means. Thus, the molded product is taken out of the molding die of the injection-molding machine.

In such a taking out robot mentioned above, the rotary motion and the successive thrust motion of the swing arm were performed independently by using a couple of servomotors in the prior art. Here, in order to take out the molded product at a high speed or to save the access time of the swing arm, the thrust motion of the swing arm is started before the rotary motion ceases. Thus, the motion of the swing arm includes an arcuate motion, which is a superimposed motion of the rotary and thrust motions.

However, upon driving the injection molding machine at high speeds, it is difficult to perform a precise arcuate motion of the swing arm at high speeds by driving the couple of servomotors synchronously, resulting in that the absorbing means of the swing arm can not reach a desired or correct position on the objective molded product. Thus, it is impossible to take the molded product out of the movable die in the injection-molding machine. Further, from a viewpoint of a production cost, it is disadvantageous to use the couple of servomotors because it requires more electric and mechanical components and a more complicated structure.

SUMMARY OF THE INVENTION

Accordingly, it is a general object of the present invention to provide a guiding structure for regulating a traveling direction of a swing arm in which the above disadvantages have been eliminated.

More specific object of the present invention to provide a guiding structure for regulating a traveling direction of a swing arm comprising: a swing arm; rotating means having a rotary axis; and converting means provided along the rotary axis of the rotating means for transmitting a rotary force caused by the rotating means to the swing arm and for regulating a traveling direction of the swing arm in accordance with a prescribed traveling path; wherein a traveling direction of the swing arm is regulated by the converting means from a rotary direction to a thrust direction parallel to the rotary axis through an arcuate motion.

Further more specific object of the present invention to provide a taking out robot for taking out a molded product from an injection molding machine comprising: a base; rotating means having a rotary shaft; a cylindrical cam slidably provided on the rotary shaft, the cylindrical cam being formed with a first cam groove and a second cam groove thereon; a first cam follower fixed on a side of the base to engage with the first cam follower; a second cam follower connected to a side of the rotary means to engage with the second cam groove; and a swing arm having absorbing means at one end thereof for detachably holding the molded product from the injection molding machine, the swing arm being connected to one end of the cylindrical cam, wherein the cylindrical cam is driven by an engagement of the second cam groove and the second cam follower so that a motion of the cylindrical cam is regulated by the engagement of the first cam groove and the first cam follower, and the motion of the cylindrical cam is transmitted to the swing arm.

Another specific object of the present invention is to provide an injection molding machine comprising: a molding die having a movable die and a fixed die for molding a molded product interposed between the fixed die and the movable die; control means for separating the movable die from the fixed die; and a taking out robot for taking out the molded product; the taking out robot comprising: a base; rotating means having a rotary shaft; a cylindrical cam slidably provided on the rotary shaft, the cylindrical cam being formed with a first cam groove and a second cam groove thereon; a first cam follower fixed on a side of the base to engage with the first cam follower; a second cam follower connected to a side of the rotary means to engage with the second cam groove; and a swing arm having absorbing means at one end thereof for detachably holding the molded product from the injection molding machine, the swing arm being connected to one end of the cylindrical cam; wherein the cylindrical cam is driven by an engagement of the second cam groove and the second cam follower so that a motion of the cylindrical cam is regulated by the engagement of the first cam groove and the first cam follower, and the motion of the cylindrical cam is transmitted to the swing arm so that the absorbing means of the swing arm detachably holds the molded product from the molded product.

BRIEF DESCRIPTION OF THE DRAWINGS

FIGS. 6(A) to 6(C) are enlarged plan views for explaining operations of the cylindrical cam by the engagement of cam followers with the cam grooves of the cylindrical cam shown in FIG. 5;

FIGS. 7(A) to 7(F) are explanatory views showing relations between the cam grooves shown in FIG. 6 and the cam followers;

FIGS. 8(A1) to 8(C2) are explanatory views for explaining a relation between the swing arm and the conversion means in the taking out robot, wherein FIG. 8(A1) is a front plan view of the taking out robot, wherein the swing arm is positioned at an initial state;

FIG. 8(A2) is a bottom plan view, with portions broken away for clarity, of the taking out robot shown in FIG. 8(A1);

FIG. 8(B1) is a front plan view of the taking out robot, wherein the swing arm is in an arcuate motion;

FIG. 8(B2) is a bottom plan view, with portions broken away for clarity, of the taking out robot shown in FIG. 8(B1);

FIG. 8(C1) is a front plan view of the taking out robot, wherein the swing arm is at a taking out position;

FIG. 8(C2) is a bottom plan view, with portions broken away for clarity, of the taking out robot shown in FIG. 8(C1)

DETAILED DESCRIPTION OF THE PREFERRED EMBODIMENTS

Next, a description is given of a preferred embodiment of a guiding structure for regulating a traveling direction of the swing arm 6 referring to attached Figures.

Figure 1:
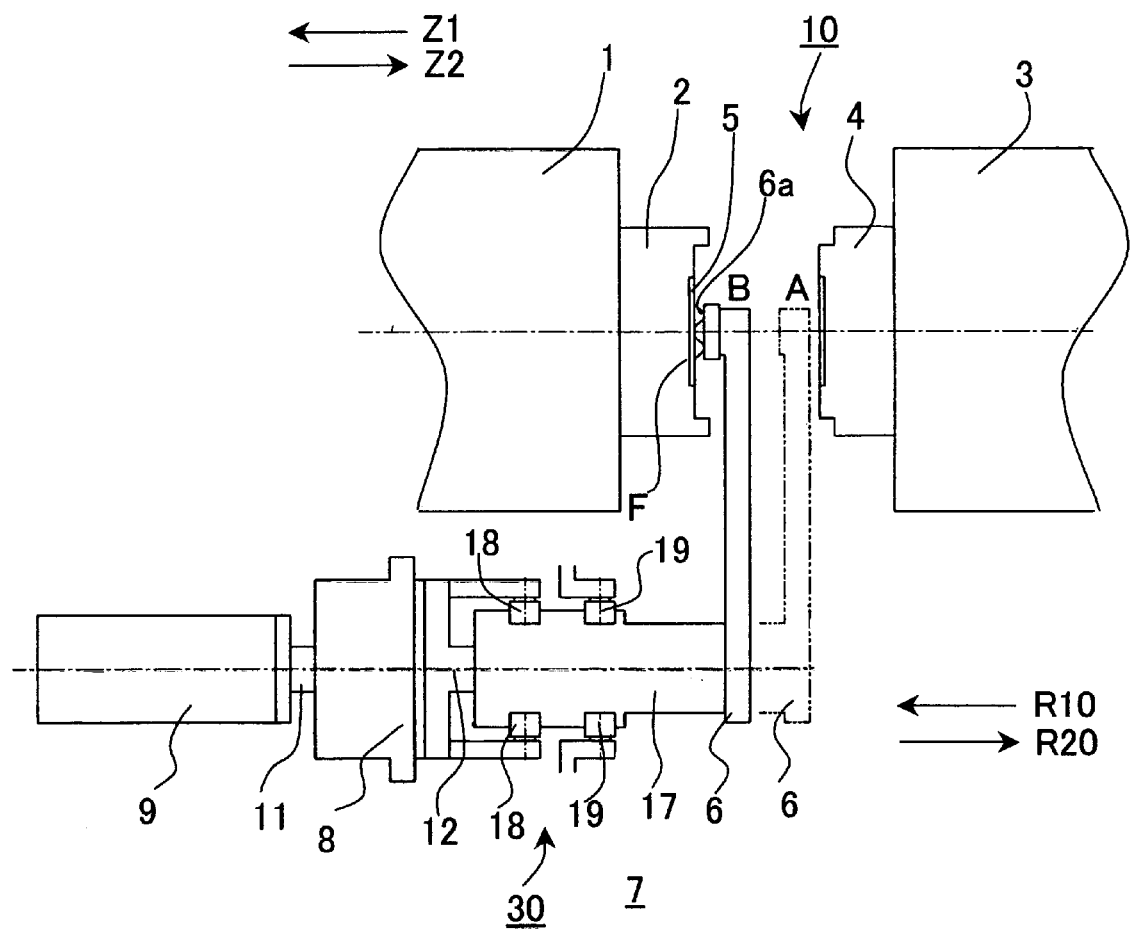
FIG. 1 is a plan view of an injection molding machine where a taking out robot having a guiding structure for regulating a traveling direction of a swing arm of the present invention is depicted as a preferred embodiment.
Figure 2:
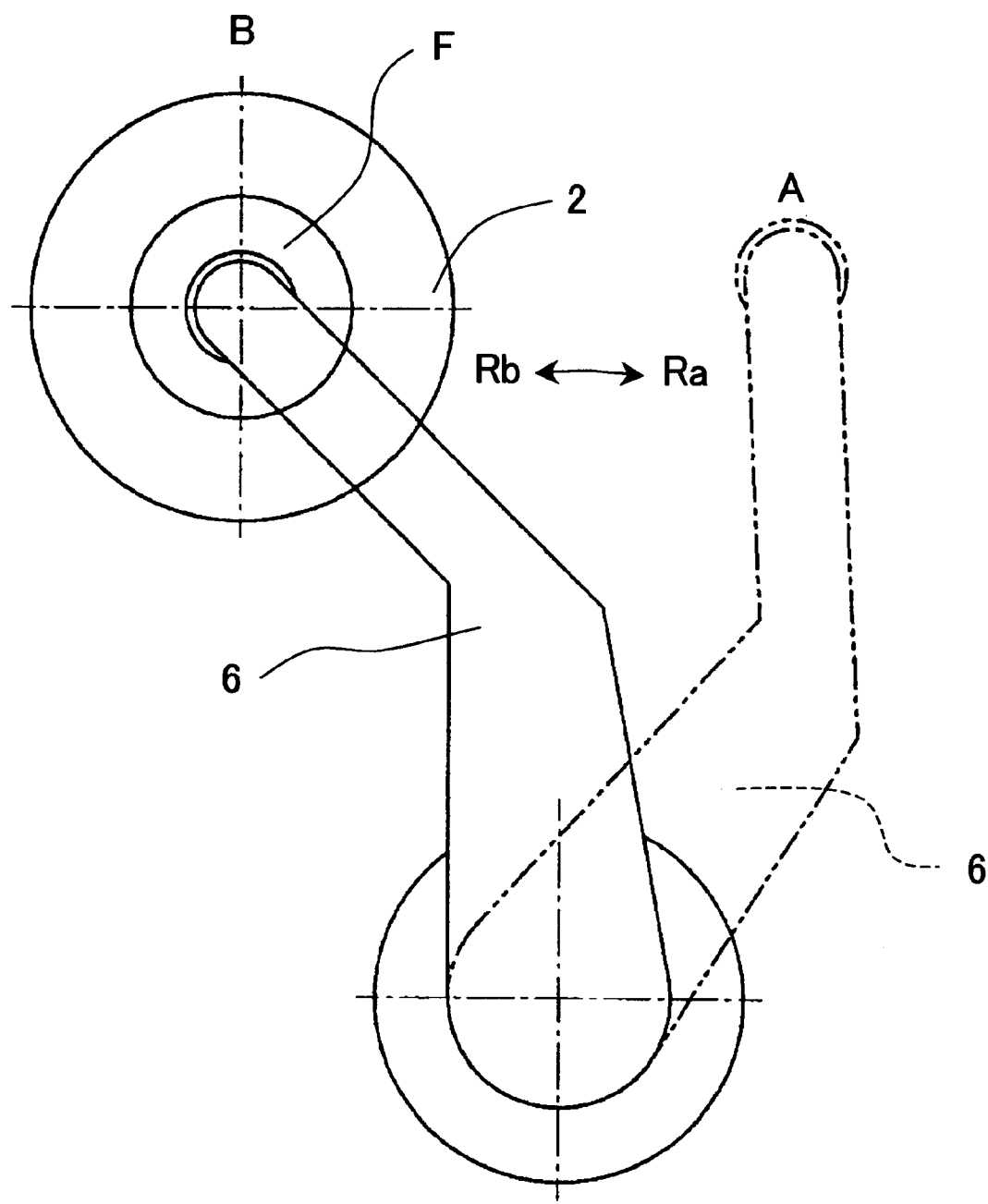
FIG. 2 is a front plan view of a swing arm of the taking out robot shown in FIG. 1.
Figure 3:
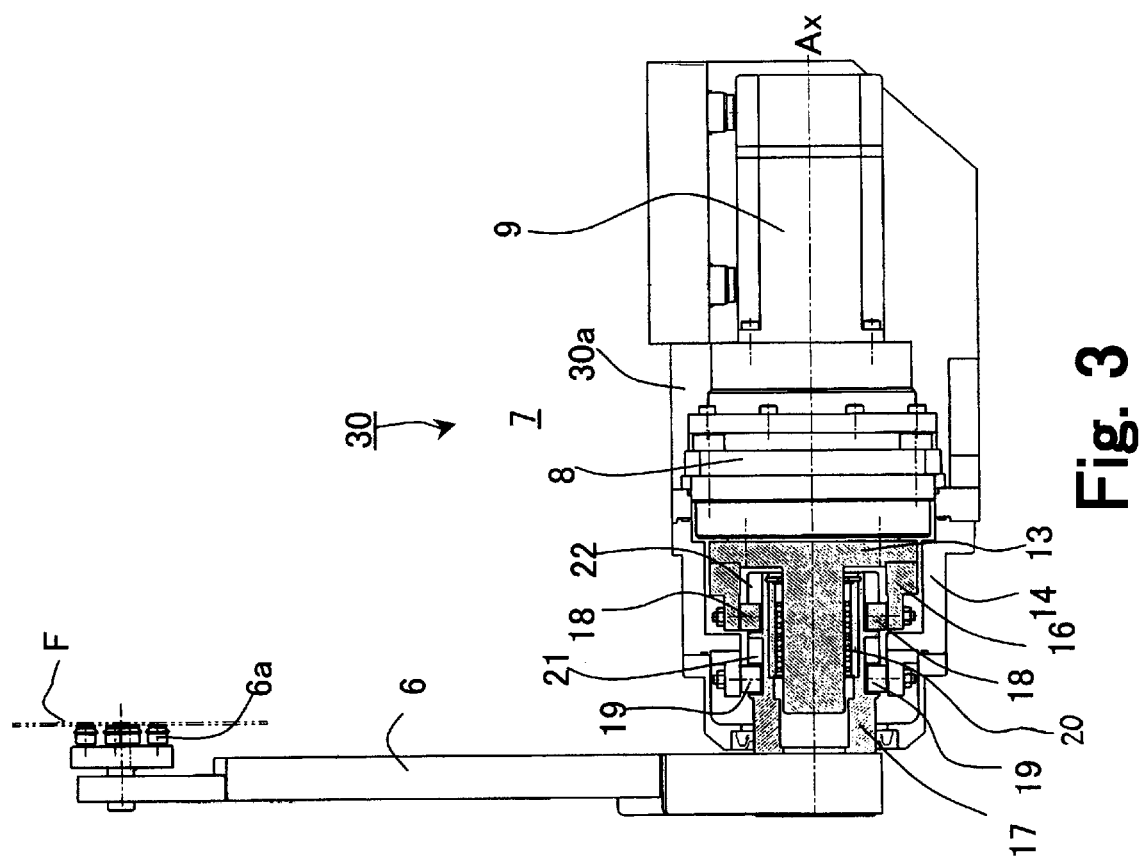
FIG. 3 is a plan view, with portions broken away for clarity, of the taking out robot shown in FIG. 1.

FIG. 1 is a plan view of an injection molding machine where a taking out robot having a guiding structure for regulating a traveling direction of a swing arm of the present invention is depicted as a preferred embodiment;

FIG. 2 is a front plan view of a swing arm of the taking out robot shown in FIG. 1; and FIG. 3 is a plan view, with portions broken away for clarity, of the taking out robot shown in FIG. 1.

It should be noted that a taking out robot 30 of the present invention shown in FIGS. 1 and 3 is used for taking out a molded product F of a movable die 2 used in an injection molding machine 10 as mentioned hereinafter.

First, a detailed description is given of the injection molding machine 10 referring to FIG. 1, wherein the taking out robot 30 of the present invention is applied to the injection molding machine 10. The injection molding machine 10 has a movable base 1 and a fixed base 3. The movable base 1 has a movable die 2, and the fixed base 3 has a fixed die 4. This movable base 1 can travel in directions shown with arrows Z1 and Z2. On the other hand, the fixed base 3 has a path (not shown) through which a material for a molded product F is injected into a cavity 5 to be defined between the movable die 2 and the fixed die 4. In this embodiment, the injection molding machine 10 is used to produce a disc-like molded product F (referred to as molded product hereinafter), for instance, a rotary information-recording medium such as an optical disc or a magneto optical disc.

Next, the description is given of the taking out robot 30 referring to FIGS. 1, 2 and 3.

The taking out robot 30 generally comprises a conversion mechanism 7 for converting a rotary motion of a main shaft 13 to a thrust motion of a cylindrical cam 17, a servomotor 9 to drive the conversion mechanism 7 through a reduction mechanism (referred to as reducer) 8 and a swing arm 6 connected to the conversion mechanism 7. Further, as shown in FIG. 1, a distal end portion of the swing arm 6 is bent to face the molded product F, and is provided with absorbing means 6a for securing the molded product F thereon.

The conversion mechanism 7 comprises the cylindrical cam 17 having a cylindrical surface on which a pair of driving cam grooves 22 and a pair of regulating cam grooves 21 (FIGS. 3, 4) are defined, a swing arm 6 fixedly provided at one end of the cylindrical cam 17, a pair of driving cam followers 18, 18 engaged with the pair of driving cam grooves 22, 22 for driving the cylindrical cam 17 and a pair of fixed cam followers 19, 19 engaged with the pair of regulating cam grooves 21, 21 for regulating the motion of the cylindrical cam 17.

At a position B the swing arm 6 holds the molded product F to remove it from the movable die 2. At a position A the swing arm 6 rotates along a plane of rotation to allow the molded product F to be detached from the swing arm 6 (FIG. 2). Between the positions A and B, the swing arm 6 performs a thrust motion in a direction shown with an arrow R10 or R20, a rotary motion and an arcuate motion including the rotary and thrust motions as mentioned hereinafter.

Next, an explanation is given of the cylindrical cam 17, the driving cam followers 18, 18 and the fixed cam followers 19, 19 that are main components of the conversion mechanism 7.

As shown in FIG. 3, the cylindrical cam 17 is slidably provided on the main shaft 13 through a bearing 20. At an end of the cylindrical cam 17, the swing arm 6 is connected. Thus, the motion of the cylindrical cam 17 is directly transmitted to the swing arm 6. The main shaft 13 is rotatably connected to the servomotor 9 through the reducer 8.

Figure 4:
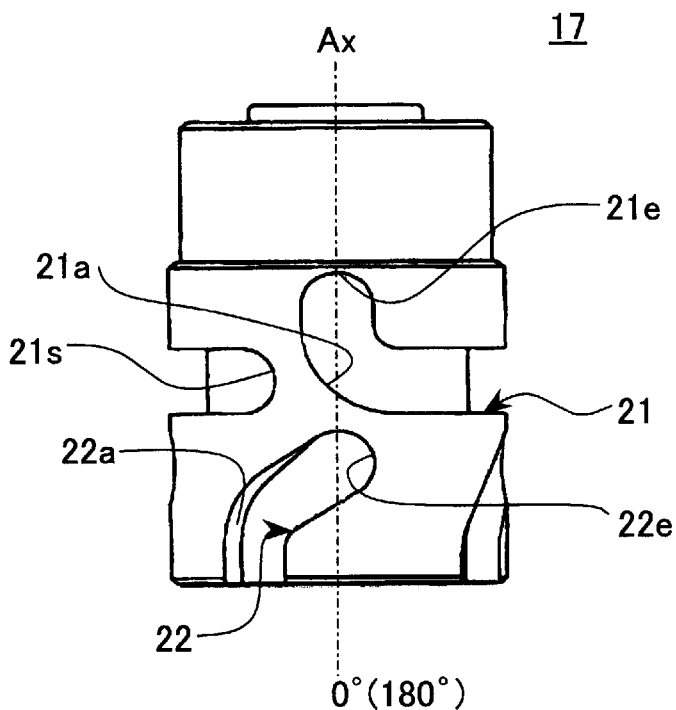
FIG. 4 is a plan view of a cylindrical cam, which is a main part of the taking out robot shown in FIG. 3.

As clearly shown in FIG. 4, the cylindrical cam 17 is formed with the pair of driving cam grooves 22, 22 and the pair of regulation cam grooves 21, 21. The pair of driving cam followers 18, 18 are fixedly connected to a rotary bracket 16 at an interval of 180 degrees, and are engaged with the pair of driving cam grooves 22, 22. The rotary bracket 16 is integrally formed with the main shaft 13. Thus, the driving cam followers 18, 18 rotate along a prescribed plane of rotation to transmit the rotary motion of the servomotor 9 to the cylindrical cam 17.

On the other hand, the pair of fixed cam followers 19, 19 are connected to a fixed bracket 14 fixed to a main chassis 30a, and are engaged with the pair of regulating cam grooves 21, 21 of the cylindrical cam 17. Thus, the motion of the cylindrical cam 17 is regulated by the engagement of the fixed cam followers 19, 19 and the fixed cam followers 19, 19. As shown in FIG. 1, the conversion mechanism 7 and the reducer 8 are rotatably connected through a rotary shaft 11, and the reducer 8 and the servomotor 9 are rotatably connected through another rotary shaft 12, respectively.

In this embodiment, the pair of fixed cam followers 19, 19 and the pair of driving cam followers 18 18 are respectively engaged with the regulating cam grooves 21, 21 and the driving cam grooves 22, 22 to increase reliability of the mechanism, however, the construction thereof is not limited to this embodiment. Needless to say, it is possible to employ one set of the driving and fixed cam followers 18, 19 and one set of the driving and regulating cam grooves 22, 21.

Further, the regulating cam grooves 21, 21 and the driving cam grooves 22 22 are formed on a surface side of the cylindrical cam 17, however, the construction thereof is not limited to this embodiment. For instance, it is possible to form the regulating and driving cam grooves 21, 22 on the sides of the driving and fixed cam followers 18, 19.

Figure 5:
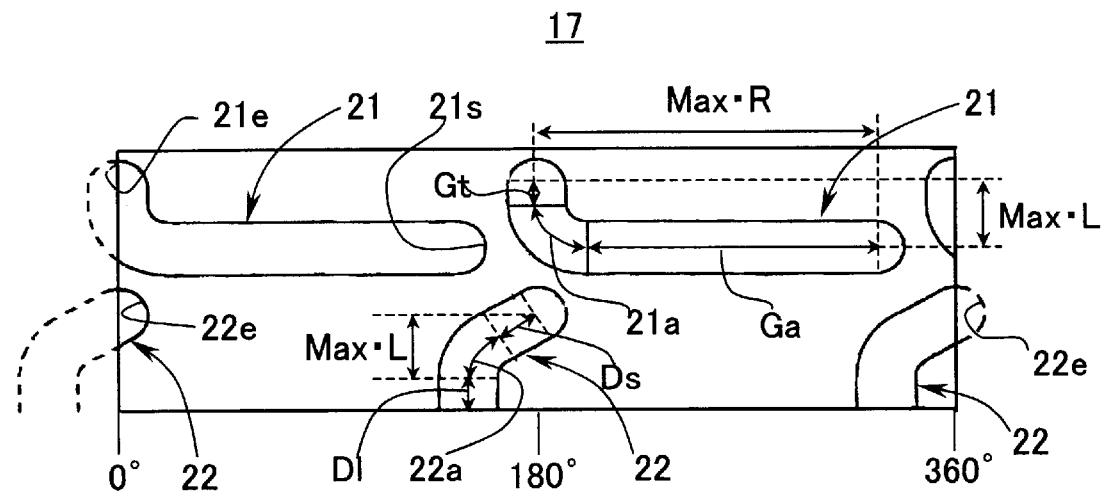
FIG. 5 is a development of the cylindrical cam shown in FIG. 4.

FIG. 4 is a plan view of a cylindrical cam, which is a main part of the taking out robot shown in FIG. 3, and FIG. 5 is a development of the cylindrical cam shown in FIG. 4;

Next, the description is given of the regulating and driving cam grooves 21, 22 formed on the cylindrical cam 17 and the fixed and driving cam followers 19, 18 referring to FIG. 4 and FIG. 5. In FIG. 5, a perpendicular direction shows a rotary angle of the cylindrical cam 17 and a vertical direction shows a traveling direction of the cylindrical cam 17 in a thrust direction parallel to a rotary axis Ax of the cylindrical cam 17.

Around the cylindrical cam 17 there are formed with the pair of regulating cam grooves 21, 21, each having the same shape, separated at 180 degrees to each other, and the pair of driving cam grooves 22, 22, each having the same shape, separated at 180 degrees to each other. Thus, the description is given of one set of the regulating cam groove 21 and the driving cam groove 22.

Specifically, the regulating cam groove 21 has three portions, i.e., an arc groove portion (referred to as arc portion) Ga extended along a circumference of the cylindrical cam 17 for regulating a rotary motion and its rotary angle of the cylindrical cam 17, a thrust groove portion (referred to as thrust portion) Gt for regulating a thrust motion of the cylindrical cam 17 and a curved groove portion (referred to as curved portion) 21a for regulating both the rotary motion and the thrust motion of the cylindrical cam 17, i.e., an arcuate motion thereof. The curved portion 21a has a curvature R1 (FIG. 7 (A)) interposed between the arc portion Ga and the thrust portion Gt. The direction of the arc portion Ga is made to be perpendicular to a rotary axis Ax of the cylindrical cam 17. The maximum rotary angle Max·R of the cylindrical cam 17 is determined by an angle range of the arc portion Ga and an angle range in the rotary direction of the curved portion 21a, resulting in a maximum rotary angle Max·R of the swing arm 6 which is fixed to the end of the cylindrical cam 17. On the other hand, a direction of the thrust portion Gt is made to be parallel to the rotary axis Ax. A length of the thrust portion Gt and a component in the thrust direction of the curved portion 21a determine the maximum traveling distance Max·L of the cylindrical cam 17 in the thrust direction. In FIGS. 4 and 5, a reference character 21e designates a distal end of the thrust portion Gt, and 21s a distal end of the arc portion Ga.

The driving cam groove 22 also has three portions, a linear portion Dl, a second curved portion 22a and a slant portion Ds. The linear portion Dl is made to be parallel to the rotary axis Ax. The slant portion Ds is made to have an slant angle to the rotary axis Ax. The second curved portion 22a has a curvature R2 (FIG. 7(A)) interposed between the linear portion Dl and the slant portion Ds. In FIGS. 4, 5, a reference character 22e designates a distal end of the slant portion Ds. A component in the thrust direction of both the second curved portion 22a and the slant portion Ds corresponds to the maximum traveling distance Max·L mentioned in the foregoing.

In this embodiment, the driving cam groove 22 is formed so that the distal end 22e of the slant portion Ds is approximately positioned under the arc portion Ga of the regulation cam groove 21. However, the positional relation thereof is not limited to this embodiment. It is possible to form the driving cam groove 22 anywhere on the cylindrical cam 17, if necessary.

FIGS. 6(A) to 6(C) are enlarged plan views for explaining operations of the cylindrical cam by the engagement of cam followers with the cam grooves of the cylindrical cam shown in FIG. 5.

Next, the description is given of a traveling process of the cylindrical cam 17 of which the regulating and driving cam grooves 21, 22 are engaged with the fixed and driving cam followers 19, 18, referring to FIGS. 6(A) to 6(C).

In this embodiment the curvature R1 of the curved portion 21a in the regulating cam groove 21 is made to be the same as the curvature R2 of the second curved portion 22a of the driving cam groove 22. Further, the regulating and driving cam grooves 21, 22 are formed so that a tangent line which touches the curved portion 21a at a vertex thereof and a tangent line which touches the second curved portion 22a at a vertex thereof intersect each other at right angles.

As mentioned in the foregoing referring to FIG. 3, the cylindrical cam 17 is rotated around the main rotary shaft 13 having the rotary axis Ax through the bearing 20, and is slidable over the main shaft 13 in the thrust direction parallel to the rotary axis Ax.

Referring to FIG. 6(A), at an initial state (rotary angle 0 degree) the fixed cam follower 19 is fitly engaged with the regulating cam groove 21 at the end (21s) of the arc portion Ga and the driving cam follower 18 is fitly engaged with the driving cam groove 22 at the linear portion Dl thereof (FIG. 5). Here, it should be noted that the fixed cam follower 19 is fixed on the fixed bracket 14 provided on the main chassis 30a and the driving cam follower 18 rotates around the rotary axis Ax of the main shaft 13 along a prescribed plane of rotation as shown in FIG. 3. Further, the driving cam follower 18 is away from the fixed cam follower 19 by an angle θo, and one end of the cylindrical cam 17 is away from the driving cam follower 18 by a distance So.

Accordingly, when the main shaft 13 is rotated in a rotary direction shown with an arrow XR, the driving cam follower 18 drives or rotates the cylindrical cam 17 around the rotary axis Ax in the same rotary direction XR by pushing a wall of the driving cam groove 22 in a normal direction. Here, the cylindrical cam 17 is only rotated because its motion is regulated by the engagement of the fixed cam follower 19 and the arc portion Ga (FIG. 5) of the regulating cam groove 21. Thus, the cylindrical cam 17 is rotated along the arc portion Ga of the regulating cam groove 21.

Referring to FIG. 6(B), when the driving cam follower 18 further rotates or drives the cylindrical cam 17 around the main shaft 13, the regulating cam groove 21 of the cylindrical cam 17 engages with the fixed cam follower 19 at the curved portion 21a (FIG. 5). Whereby, the cylindrical cam 17 is given at the same time both a thrust motion in a downward direction and a rotary motion in the rotary direction XR, i.e, an arcuate motion. It will be understood that a traveling distance S of the cylindrical cam 17 in the thrust direction is determined by an equation, $S=S1-So$, wherein S1 designates a distance between the end of the cylindrical cam 17 and the driving cam follower 18.

Here, it should be noted that a distance from the plane of rotation (not shown) of the driving cam follower 18 to the fixed cam follower 19 along the rotary axis Ax is always kept at a constant value. Further, in FIG. 6(B), θ1 designates a rotary angle between the fixed cam follower 19 engaged with the curved portion 21a in the regulating cam groove 21 and the driving cam follower 18.

Referring to FIG. 6(C), after the arcuate motion, the cylindrical cam 17 further moves downward in the thrust direction by being regulated with the engagement of the thrust portion Gt of the regulating cam groove 21 and the fixed cam follower 19 while the driving cam follower 18 is pushing and sliding the wall of the slant portion Ds of the driving cam groove 22. It will be understood that an overall traveling distance S of the cylindrical cam 17 in the thrust direction is determined by an equation, S=S2−So, wherein S2 designates a distance between the end of the cylindrical cam 17 and the driving cam follower 18, and an overall rotary angle θ of the cylindrical cam 17 is determined by an equation, θ=θo−θ2, wherein θ2 is a rotary angle between the driving cam follower 18 and the fixed cam follower 19 engaged with the thrust portion Gt of the regulating cam groove 21.

FIGS. 7(A) to 7(F) are explanatory views showing relations between the cam grooves shown in FIG. 6 and the cam followers.

Next, a further detail description is given of the relation between the driving and fixed cam followers 18, 19 and the regulating and driving cam grooves 21, 22, referring to FIGS. 7(A) to 7(F).

In FIGS. 7(A) to 7(F), it should be noted that the fixed cam follower 19 is fixed on the main chassis 30a, and the driving cam follower 18 is fixed on the side of the main shaft 13 so as to be rotated along a predetermined plane of rotation which is keeping a constant distance from the fixed cam follower 19. Thus the cylindrical cam 17 is moved around the main shaft 13 being regulated by causing the fixed and driving cam follower 19, 18 to engage with the regulating and driving cam grooves 21, 22 of the cylindrical cam 17. Here, the overall shape of cylindrical cam 17 is not depicted but only the shapes of the regulating and driving cam grooves 21, 22, for simplicity.

FIG. 7(A) is a schematic view for explaining constructions of the regulating cam groove 21 and the driving cam groove 22.

The curved portions 21a, 22a of the regulating and driving cam grooves 21, 22 have the same curvature (R1= R2), and the same width (W1=W2). Further, the surfaces of the regulating and driving cam groove 21, 22 have an identical cylindrical surface.

FIG. 7(B) is a schematic view showing a state where the cylindrical cam 17 is only rotated in a rotary direction shown with an arrow XR, wherein the driving cam follower 18 is engaged with the linear portion Dl of the driving cam groove 22 and the fixed cam follower 19 is engaged with the arc portion Ga of the regulating cam groove 21.

When the main shaft 13 is rotated in the rotary direction XR, the driving cam follower 18 gives a normal force in a direction shown with an arrow to the wall of the linear portion Dl of the driving cam groove 22. Thereby, the cylindrical cam 17 is only rotated around the main shaft 13 in the same direction as the normal force. Thus, the cylindrical cam 17 hardly accepts a large resist force from the fix cam follower 19. This enables an high-speed operation of the machine.

FIG. 7(C) is a schematic view showing a positional relation between the fixed and driving cam followers 19, 18 and the regulating and driving cam grooves 21, 22 of the cylindrical cam 17, wherein the cam cylinder 17 is rotated at a position where the end of the curved portion 21a in the regulating cam groove 21 is close to the fixed cam follower 19 by the engagement of the driving cam follower 18 and the linear portion Dl of the driving cam groove 22.

As shown in FIG. 7(C), a direction of the normal force to the wall of the second curved portion 22a in the driving cam groove 22 is shown with an arrow. Here, a reference character θB1 designates an angle between an extended line in the direction of the normal force and an extended line in the rotary direction XR of the driving cam follower 18, S1 a standard line which is passing through a center of the fixed cam follower 19, and is parallel to the rotary direction (or a plane of rotation) XR of the driving can follower, and θA1 an angle between an extended line in the traveling direction of the cylindrical cam 17 shown with an arrow and the standard line S1.

In the present invention, the angle θA1 is made to be equal to the angle θB1 to allow the cylindrical cam 17 to move along the curved portion 21a without a resist force. In other words, a tangent line which touches the regulating cam groove 21 at a contact point of the fixed cam follower 19 and the tangent line which touches the driving cam groove 22 at a contact point of the driving cam follower 22 intersect at right angles. This enables a smooth motion of the cylindrical cam 17.

FIG. 7(D) is a schematic view showing a positional relation between the fixed and driving cam followers 19, 18 and the regulating and driving cam grooves 21, 22 of the cylindrical cam 17, wherein the cylindrical cam 17 is rotated at a position where a center of the curved portion 21a in the regulating cam groove 21 is close to the fixed cam follower 19 by the engagement of the driving cam follower 18 and the linear portion Dl of the driving cam groove 22.

As shown in FIG. 7(D), a direction of the normal force to the wall of the second curved portion 22a in the driving cam groove 22 is shown with an arrow, wherein a reference character θB2 designates an angle defined between an extended line in the direction of the normal force and an extended line in the rotary direction XR of the driving cam follower 18, and θA2 an angle defined between the standard line S1 and an extended line in a traveling direction of the cylindrical cam 17 shown with an arrow. Here, the angle θA2 is made to be equal to the angle θB2. Thus, the tangent line which touches the regulating cam groove 21 at a contact point of the fixed cam follower 19 and the tangent line which touches the driving cam groove 22 at a contact point of the driving cam follower 22 intersect at right angles. This contractual feature allows the cylindrical cam to travel smoothly.

FIG. 7(E) is a schematic view showing a positional relation between the fixed and driving cam followers and the regulating and driving cam grooves formed on the cylindrical cam, wherein the cylindrical cam 17 is rotated at a position where another end of the curved portion 21a in the regulating cam groove 21 is close to the fixed cam follower 19 by the engagement of the driving cam follower 18 and the linear portion Dl in the driving cam groove 22.

As shown in FIG. 7(E), the direction of the normal force to the wall of the second curved portion 22a in the driving cam groove 22 is shown with an arrow, wherein a reference character θB3 designates an angle between an extended line in the direction of the normal force and an extended line in the rotary direction XR of the driving cam follower, and θA3 an angle defined between the standard line S1 and an extended line in a traveling direction of the cylindrical cam 17. The angle θA3 is made to be equal to the angle θB3. Thus, the tangent line which touches the regulating cam groove 21 at a contact point of the fixed cam follower 19 and the tangent line which touches the driving cam groove 22 at a contact point of the driving cam follower 22 intersect at right angles. This contractual feature of the present invention allows the cylindrical cam 17 to travel smoothly.

FIG. 7(F) is a schematic view showing a state where the cylindrical cam 17 slidingly travels at a position where the end of the slant portion Ds in the driving cam groove 22 is engaged with the driving cam follower 18 at the end of the thrust portion Gt in the regulating cam groove 21.

As shown in FIG. 7(F), in this case an angle between a direction of the normal force shown with an arrow to the wall of the slant portion Ds in the driving cam groove 22 and the rotary direction XR is made to be 60 degrees.

On the other hand, when the fixed cam follower 19 is engaged with the thrust portion Gt in the regulating cam groove 21, the traveling direction of the cylindrical cam 17 becomes the thrust direction (90 degrees). This angle is a maximum of 90 degrees. Thus, the cylindrical cam 17 travels in the thrust direction downward. As the driving cam follower 18 abates the end of the slant portion in the driving cam groove 22, the cylindrical cam 17 is moved in the thrust direction downward by the rotation of the driving cam follower 18.

FIGS. 8(A1) to 8(C2) are explanatory views for explaining a relation between the swing arm and the conversion means in the taking out robot.

Next, the description is given of a relational operation between the taking out robot 30 and the swing arm 6, referring to FIGS. 8(A1) to 8(C2).

FIG. 8(A1) is a front view of the swing arm installed on the take out robot, and FIG. 8(A2) is a bottom view, with portions broken away for clarity, of FIG. 8(A1). These figures are corresponding to FIG. 7(B), wherein the fixed and driving cam followers 19, 18 are engaged with the driving and regulating cam grooves 22, 21, respectively. The swing arm 6 is positioned, for instance, at the position A shown in FIG. 1.

FIG. 8(B1) is a front view of the swing arm installed on the taking out robot, and FIG. 8(B2) is a bottom view, with portions broken away for clarity, of FIG. 8(B1). These Figures are corresponding to FIG. 7(C), and show a state where the swing arm 6 is traveling in a direction from the position A to the position B shown in FIG. 1.

FIG. 8(C1) is a front view of the swing arm installed on the taking out robot, and FIG. 8(C2) is a bottom view, with portion broken away for clarity, of FIG. 8(C1). These figures are corresponding to FIG. 7(F), wherein the fixed and driving cam followers 19, 18 are engaged with the regulating and driving cam grooves 21, 22, respectively. The swing arm 6 is positioned, for instance, at the position B shown in FIG. 1.

Figure 9:
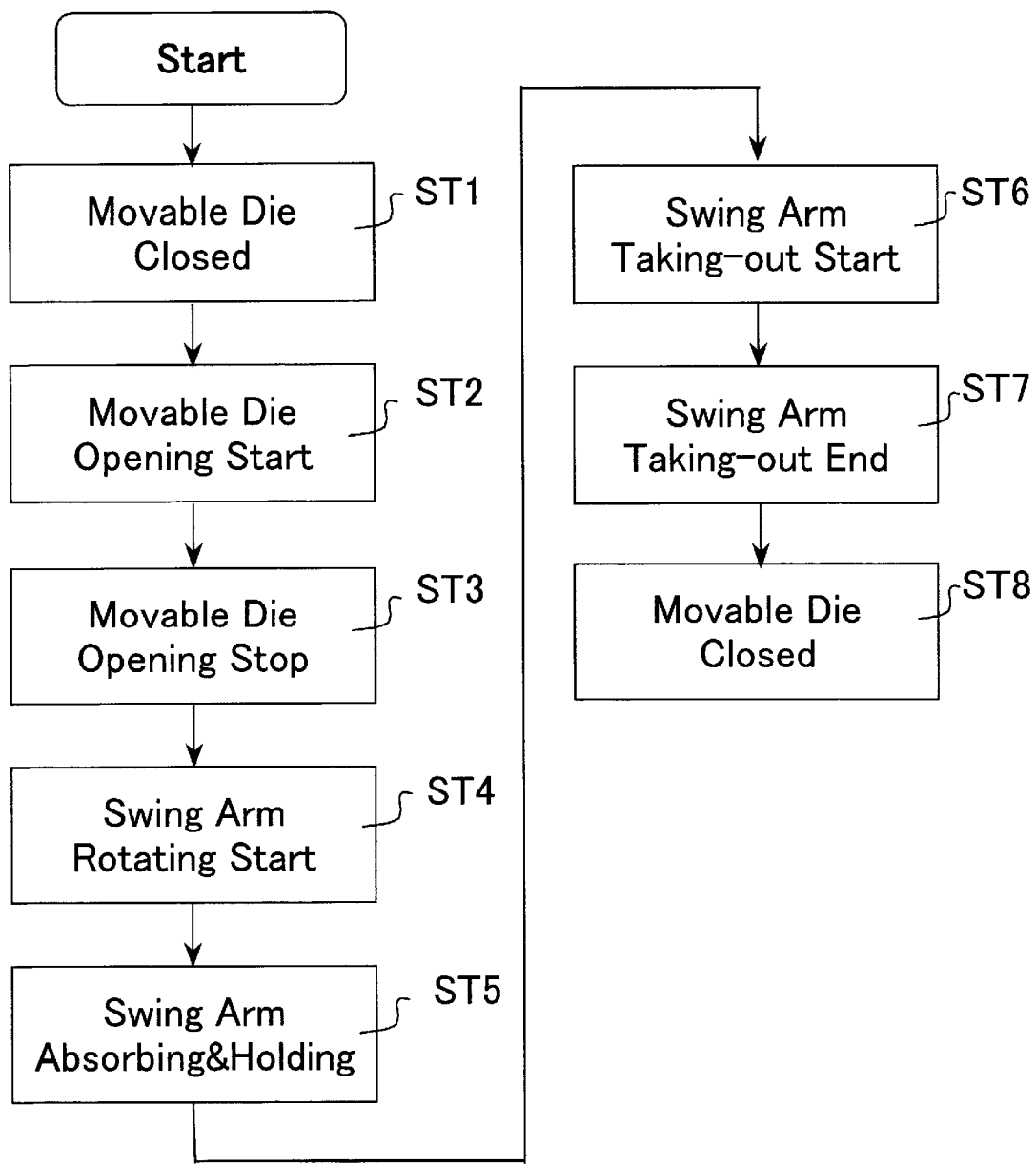
FIG. 9 is a flow chart for explaining a taking out operation of a molded product from an injection molding machine employing the taking out robot of the present invention.

FIG. 9 is a flow chart for explaining a taking out operation of a molded product from an injection molding machine employing the taking out robot of the present invention.

Next, the description is given of the operation of the injection molding machine 10 based on steps ST1 to ST9 in a flow chart shown in FIG. 9.
ST1) Movable Die 2 is at a Closed State The movable die 2 provided on the movable base 1 is at a closed state by being closely contacted with the fixed die 4 provided on the fixed base 3, wherein molding resin is injected between the movable and fixed dies 2, 4 to form a molded product F as shown in FIG. 1.

In addition, the swing arm 6 is positioned at an initial position A as shown with tow-dotted lines in FIGS. 1 and 2. At this closed state, the positional relation between the cylindrical cam 17 and the fixed cam follower 19 is shown in FIG. 6(A), FIG. 7(B), FIGS. 8(A1) and 8(A2), wherein the driving cam followers 18 are present at the linear portion Dl in the driving cam groove 22 and the fixed cam follower 19 is engaged with the arc portion Ga in the regulating cam groove 21 of the cylindrical cam 17, respectively.
ST2) Movable Die 2 Starts on an Opening Operation When the prescribed molding operation is over, the movable die 2 holding the molded product F starts on an opening operation from the fixed die 4 based on an operation program installed in the injection molding machine 10. Thus, the movable die 2 begins to separate from the fixed die 4.
ST3) Movable Die 2 Stops on the Opening Operation Then, the movable die 2 stops at a predetermined position or a die opening position. This stop state is detected by detecting means such as sensors and switches (not shown) provided in the injection molding machine 10. These operations are intensively controlled by the operation program installed in the injection molding machine 10.
ST4) The Swing Arm 6 Starts to Rotate As soon as the movable die 2 stops at a predetermined position, a control device (not shown) provided in the injection molding machine 10 drives the servomotor 9 of the taking out robot 30 based on the direction of the control program. The rotation of the servomotor 9 is transmitted to the swing arm 6 through the reducer 8 and the conversion mechanism 7. Thus, the swing arm 6 starts to rotate in the direction shown with an arrow Rb shown in FIG. 2. This state corresponds to FIG. 7(B).

Specifically, the control device (not shown) servo-controls the servomotor 9 by transmitting a servo signal to the servomotor 9 to rotate it at an angle corresponding to a desired value. Thereby, the reducer 8 rotates the main shaft 13. Thus, the swing arm 6 rotates in the direction shown with the arrow Rb shown in FIG. 2. This state corresponds to FIG. 7(C). After that, the swing arm 6 proceeds to an arcuate motion from the rotary motion. In other words, the swing arm 6 performs a thrust motion in the direction shown with the arrow R10 in FIG. 1 along with the rotary motion. This state corresponds to FIG. 7(D).

In this case, the direction of normal force exerted to the wall of the driving cam groove 22 by the driving cam follower 18 accords with the traveling direction of the regulating cam grooves 21 ($\theta A1 = \theta A2$), and the extended line of tangent which touches the regulating cam groove 21 at a contact point of the fixed cam follower 19 and the extended line of tangent which touches the driving cam groove 22 at a contact point of the driving cam follower 22 intersect at right angles each other, resulting in a smooth arcuate motion of the swing arm 6. This fact enables the swing arm 6 to proceed to a smooth thrust motion from the arcuate motion.
ST5) Swing Arm 6 Absorbs and Holds the Molded Product F with the Absorbing Means 6a After that, the swing arm 6 linearly proceeds close to the movable die 2 in the direction shown with the arrow R10 shown in FIG. 1. When the swing arm 6 touches the molded product F, an ejecting pin (not shown) operates to eject the molded product F from the movable die 2. The molded product F ejected from the movable die 2 is held by the absorbing means 6a provided at an end of the swing arm 6. This corresponds to FIG. 7(F), wherein the cylindrical cam 17 moves in the thrust direction.
ST6) Swing Arm 6 Starts on a Taking Out Operation When it is confirmed that the molded product F is held by the absorbing means 6a of the swing arm 6, the control device (not shown) transmits a servo signal to the servomotor 9 to rotate it inversely.

Thereby, the swing arm 6 starts to move in an inverse order mentioned above. In other words, the cylindrical cam 17 moves to the initial state as shown in FIG. 7(B).

ST7) Swing Arm 6 Stops on the Taking Out Operation

Specifically, the driving cam follower 18 returns to the initial state shown in FIG. 7(B) from the state shown in FIG. 7(F) through FIG. 7(E)–FIG. 7(C), in such a manner that the driving cam follower 18 is successively engaged with the distal end portion 22e, the slant portion Ds and the linear portion Dl in the driving cam groove 22. Thus, the cylindrical cam 17 also returns to the initial state shown in FIG. 7(B) by being regulated by the engagement of the regulating cam groove 21 and the fixed cam follower 19. At the initial state shown in FIG. 7(B), the molded product F is detached from the absorbing means 6a.

ST8) Movable Die 2 Returns to Be Closed

When the swing arm 6 returns to the taking out position, the controlling device (not shown) out puts a signal to the injection molding machine 10 to close the movable die 2.

These steps (ST1 to ST8) mentioned above are repeated again.

According to the embodiment of the injection molding machine 10 applied to the present invention, a molding cycle time for molding, for instance, a time required for producing a compact disc (CD) is reduced to 3.6 sec/cycle from 4 sec/cycle. Thus, it is possible to increase 10% production speed compared with one in the prior art.

As mentioned above, according to the embodiment of a guiding structure for regulating a traveling direction of a swing arm, the guiding structure comprises rotating means having a rotary shaft, conversion means for converting a rotary motion of the rotating means to a thrust motion of the swing arm, the conversion means disposed along the rotary shaft of the rotating means, and a swing arm connected to the conversion means, wherein the conversion means changes a rotary motion of the swing arm into the thrust motion thereof in a direction parallel to the rotary shaft through an arcuate motion thereof. Thus, it is possible to reduce electric and mechanical components of the taking out robot, resulting in a reduction of production cost of the taking out robot.

Further, when the taking out robot is applied to an injection molding machine, it is possible to swiftly and securely take out the molded product from the molding die thereof.

While the embodiments of the present invention, as herein disclosed, constitute a preferred form, it is to be understood that other form might be adopted.

What is claimed is:

1. A guiding structure for regulating a traveling direction of a swing arm comprising:
    a swing arm;
    rotating means having a rotary axis; and
    converting means comprising a first cam follower engaged with a first cam groove having a first prescribed cam curve and a second cam follower engaged with a second cam groove having a second prescribed cam curve, and provided along the rotary axis of the rotating means for transmitting a rotary force caused by the rotating means to the swing arm and for regulating a traveling direction of the swing arm in accordance with a prescribed traveling path, wherein the first cam follower and the first cam groove being made for regulating the traveling direction of the swing arm, and wherein the second cam follower and the second cam groove being made for transmitting the rotary force of the rotary means to the swing arm, and
    wherein a traveling direction of the swing arm is regulated by the converting means from a rotary direction to a thrust direction parallel to the rotary axis through an arcuate motion.

2. The guiding structure as claimed in claim 1, wherein the first prescribed cam curve has a rotary regulating portion, an arcuate regulation portion and a thrust regulation portion, and the second prescribed cam curve has a linear portion, a slant portion and a curved portion interposed therebetween.

3. The guiding structure as claimed in claim 2, wherein the arcuate regulation portion of the first cam groove and the curved portion of the second cam groove has an identical curvature.

4. The guiding structure as claimed in claim 3, wherein an extended line of a tangent which touches the arcuate regulation portion at a point where the first cam follower contacts and an extended line of a tangent which touches the curved portion at a point where the second cam follower contacts intersect each other.

5. The guiding structure as claimed in claim 1, wherein the converting means further comprises a cylindrical cam slidably provided on a rotary shaft connected to the rotating means, the cylindrical cam being formed with the first cam groove and the second cam groove, the first cam follower engaged with the first cam groove and the second cam follower engaged with the second cam groove.

6. The guiding structure as claimed in claim 5, wherein the first cam follower is a fixed cam follower for regulating the traveling direction of the cylindrical cam and the second cam follower is a driving cam follower for transmitting the rotary force of the rotating means to the cylindrical cam to drive the swing arm.

7. The guiding structure as claimed in claim 1, wherein the rotating means have only one servomotor.

8. A robot for removing a molded product from an injection molding machine comprising:
    a base;
    rotating means having a rotary shaft;
    a cylindrical cam slidably provided on the rotary shaft, the cylindrical cam being formed with a first cam groove and a second cam groove thereon;
    a first cam follower fixed on a side of the base to engage with the first cam follower;
    a second cam follower connected to a side of the rotary means to engage with the second cam groove; and
    a swing arm having absorbing means at one end thereof for detachably holding the molded product from the injection molding machine; the swing arm being connected to one end of the cylindrical cam;
    wherein the cylindrical cam is driven by an engagement of the second cam groove and the second cam follower so that a motion of the cylindrical cam is regulated by the engagement of the first cam groove and the first cam follower, and the motion of the cylindrical cam is transmitted to the swing arm.

9. The robot as claimed in claim 8, wherein the rotating means have only one servomotor.

10. An injection molding machine comprising:
    a molding die having a movable die and a fixed die for molding a molded product interposed between the fixed die and the movable die;
    control means for separating the movable die from the fixed die; and
    a robot for removing the molded product; the robot comprising:
    a base;

rotating means having a rotary shaft;

a cylindrical cam slidably provided on the rotary shaft, the cylindrical cam being formed with a first cam groove and a second cam groove thereon;

a first cam follower fixed on a side of the base to engage with the first cam follower, a second cam follower connected to a side of the rotary means to engage with the second cam groove; and a swing arm having absorbing means at one end thereof for detachably holding the molded product from the injection molding machine; the swing arm being connected to one end of the cylindrical cam;

wherein the cylindrical cam is driven by an engagement of the second cam groove and the second cam follower so that a motion of the cylindrical cam is regulated by the engagement of the first cam groove and the first cam follower, and the motion of the cylindrical cam is transmitted to the swing arm so that the absorbing means of the swing arm detachably holds the molded product from the molded product.

* * * * *